United States Patent
Bergkvist et al.

(10) Patent No.: US 12,363,369 B2
(45) Date of Patent: Jul. 15, 2025

(54) REMOTE CONTROL DEVICE, RELATED DEVICES, AND RELATED METHODS FOR IDENTIFYING A USER OF A REMOTE CONTROL DEVICE

(71) Applicant: Sony Group Corporation, Tokyo (JP)

(72) Inventors: Hannes Bergkvist, Rydeback (SE); Peter Exner, Malmö (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/565,974

(22) PCT Filed: Jun. 3, 2022

(86) PCT No.: PCT/EP2022/065247
§ 371 (c)(1),
(2) Date: Nov. 30, 2023

(87) PCT Pub. No.: WO2023/280491
PCT Pub. Date: Jan. 12, 2023

(65) Prior Publication Data
US 2024/0292049 A1    Aug. 29, 2024

(30) Foreign Application Priority Data
Jul. 7, 2021   (SE) .................................. 2150897-3

(51) Int. Cl.
*H04N 21/422* (2011.01)
*H04N 21/4223* (2011.01)
(Continued)

(52) U.S. Cl.
CPC ... *H04N 21/42222* (2013.01); *H04N 21/4223* (2013.01); *H04N 21/431* (2013.01); *H04N 21/441* (2013.01)

(58) Field of Classification Search
CPC ......... H04N 21/42222; H04N 21/4223; H04N 21/431; H04N 21/441; H04N 21/4751;
(Continued)

(56) References Cited

U.S. PATENT DOCUMENTS 8,856,845 B2    10/2014    Wang
8,949,070 B1    2/2015    Kahn
(Continued)

FOREIGN PATENT DOCUMENTS

EP    2154882 A1    2/2010
WO    2017100458 A1    6/2017

OTHER PUBLICATIONS

International Search Report from corresponding International Application No. PCT/EP2022/065247, mailed on Sep. 19, 2022, 15 pages.
(Continued)

*Primary Examiner* — John W Miller
*Assistant Examiner* — Omer Khalid
(74) *Attorney, Agent, or Firm* — Tucker Ellis LLP

(57) ABSTRACT

A remote control device is provided. The remote control device comprises a movement sensor, memory circuitry, a wireless interface, and processor circuitry configured to operate according to a movement model for identifying movement of the remote control device. The processor circuitry is configured to obtain, from the movement sensor, movement data indicative of movement of the remote control device. The processor circuitry is configured to determine, based on the movement data and by using the movement model, a user parameter indicative of a user of the remote control device. The processor circuitry is configured to determine whether the user parameter satisfies a first criterion. The processor circuitry is configured to, when the
(Continued)

user parameter satisfies the first criterion, output the user parameter to a display device.

18 Claims, 7 Drawing Sheets

(51) Int. Cl.
*H04N 21/431* (2011.01)
*H04N 21/441* (2011.01)

(58) Field of Classification Search
CPC ........ H04N 21/42204; H04N 21/42201; G06F 3/017; G06F 3/0346; G06F 21/316
USPC ......................................................... 348/734
See application file for complete search history.

(56) References Cited

U.S. PATENT DOCUMENTS

| | | |
|---|---|---|
| 8,964,127 B2 | 2/2015 | Wang |
| 9,094,722 B2 | 7/2015 | Phillips |
| 2010/0042564 A1 | 2/2010 | Harrison |
| 2010/0083373 A1 | 4/2010 | White |
| 2013/0232142 A1 | 9/2013 | Nielsen |
| 2013/0326555 A1* | 12/2013 | McMahon ......... H04N 21/4661 725/38 |
| 2014/0184922 A1 | 7/2014 | Schafer |
| 2015/0264439 A1 | 9/2015 | Karlin |
| 2018/0014187 A1 | 1/2018 | Chan |
| 2019/0012452 A1* | 1/2019 | Asnis ...................... G06F 3/017 |
| 2020/0220914 A1 | 7/2020 | Carrigan |

OTHER PUBLICATIONS

Office Action and Search Report from corresponding Swedish Application No. 2150897-3, mailed on Mar. 16, 2022, 11 pages.

\* cited by examiner

REMOTE CONTROL DEVICE, RELATED DEVICES, AND RELATED METHODS FOR IDENTIFYING A USER OF A REMOTE CONTROL DEVICE

TECHNICAL FIELD

The present disclosure pertains to the field of electronic devices and remote control devices. The present disclosure relates to a remote control device and a display device, and related methods.

BACKGROUND

Today, thanks to the digital revolution, users got access to a lot of digital content such as movies, videos, documentaries. Televisions (such as smart televisions, TVs, and/or internet connected TVs), run one or more applications for providing digital content, such as through digital content providers (such as providers of video content, and/or music content). The digital content can be provided based on an account created during a signup process to an application. The application can provide a personalized content recommendation based on the account. However, for example, in a household, there may be multiple people sharing a TV, such as families, couples. In such a household, often one account is used for the application. As a result, the same recommendations or irrelevant recommendations are presented for all the users of the same TV, which leads to a suboptimal user experience. Furthermore, a task as setting up an account for kids and activating parental controls is often discarded as it is difficult for an average user.

SUMMARY

There may be multiple ways to detect one or more users accessing the digital content of a TV or of a display device. However, it is difficult to detect and/or identify different users of a display device.

Accordingly, there is a need for remote control devices, display devices, and related methods which may mitigate, alleviate, or address the shortcomings existing and may provide a seamless identification of a user in a power-efficient and processing-efficient manner and in a privacy preserving manner.

A remote control device is provided. The remote control device comprises a movement sensor, memory circuitry, a wireless interface, and processor circuitry configured to operate according to a movement model for identifying movement of the remote control device. The processor circuitry is configured to obtain, from the movement sensor, movement data indicative of movement of the remote control device. The processor circuitry is configured to determine, based on the movement data and by using the movement model, a user parameter indicative of a user of the remote control device. The processor circuitry is configured to determine whether the user parameter satisfies a first criterion. The processor circuitry is configured to, when the user parameter satisfies the first criterion, output the user parameter to a display device.

Further a method, performed by a remote control device, is disclosed. The method comprises obtaining, from the movement sensor, movement data indicative of movement of the remote control device. The method comprises determining, based on the movement data and by using the movement model, a user parameter indicative of a user of the remote control device. The method comprises determining whether the user parameter satisfies a first criterion. The method comprises, when the user parameter satisfies the first criterion, outputting the user parameter to a display device.

The disclosed remote control device and related method may provide an improved speed and accuracy of a detection of a user operating the remote control device. It is an advantage of the present disclosure that it may provide a seamless detection of a user. The improved accuracy of detection may enable switching to an appropriate mode, which may, for example, improve parental lock security. It is an advantage of the present disclosure that it can alleviate accidental play of costly data continuously. It is an advantage of the present disclosure that it reduces the risk of intermixing of content recommendations belonging to multiple users, by dynamically identifying the switch and/or change of a user. In other words, it is an advantage of the present disclosure to provide fast and accurate user identification for personalized content recommendation. For example, it may be possible on a display device, to manually log out and switch users. However, as this is often forgotten or not performed, the recommendations for a user account get irrelevant (such as polluted) by intermixing several users' viewing habits.

It is an advantage of the present disclosure that it mitigates the privacy concerns that may arise while switching between the users. The disclosed remote control device may also benefit from a power-efficient detection.

Further, a display device is provided. The display device comprises a display, a camera, memory circuitry, a wireless interface, and processor circuitry. The processor circuitry is configured to obtain, from a remote control device, movement data indicative of movement of the remote control device. The processor circuitry is configured to obtain, from the camera, image data. The processor circuitry is configured to determine, based on the image data, identification data indicative of a user operating the remote control device. The processor circuitry is configured to determine, based on the movement data and the identification data, a user parameter indicative of the user. The processor circuitry is configured to update a movement model based on the user parameter. The processor circuitry is configured to output the updated movement model to the remote control device.

Further a method, performed by a display device, for identifying a user operating a remote control device, is disclosed. The method comprises obtaining, from a remote control device, movement data indicative of movement of the remote control device. The method comprises obtaining, from the camera, image data. The method comprises determining, based on the image data, identification data indicative of the user operating the remote control device. The method comprises determining, based on the movement data and the identification data, a user parameter indicative of the user. The method comprises updating, a movement model based on the user parameter. The method comprises outputting, the updated movement model to the remote control device.

The present disclosure may improve the accuracy of identifying a user operating and/or using the display device. The display device and the associated method thereby help to minimize the false positives (such as false positives when identifying a user of a remote control device). In other words, the display device and the associated method may provide a reduction of false identifications of users. The display device and the associated method thereby help to improve a score (such as confidence score of identification, for example F1-score). It is an advantage of the present disclosure that it can offload resource-intense computations from the remote control device, which improves the battery performance and longevity of the remote control device and provides processing-efficient training and/or inference. For example, the display device may use resource-intense models, such as machine learning algorithms, to cluster the motion data, receiving from the remote control device, to dynamically distinguish (such as identify) between different users.

It is an advantage of the present disclosure that it mitigates the concerns regarding privacy.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
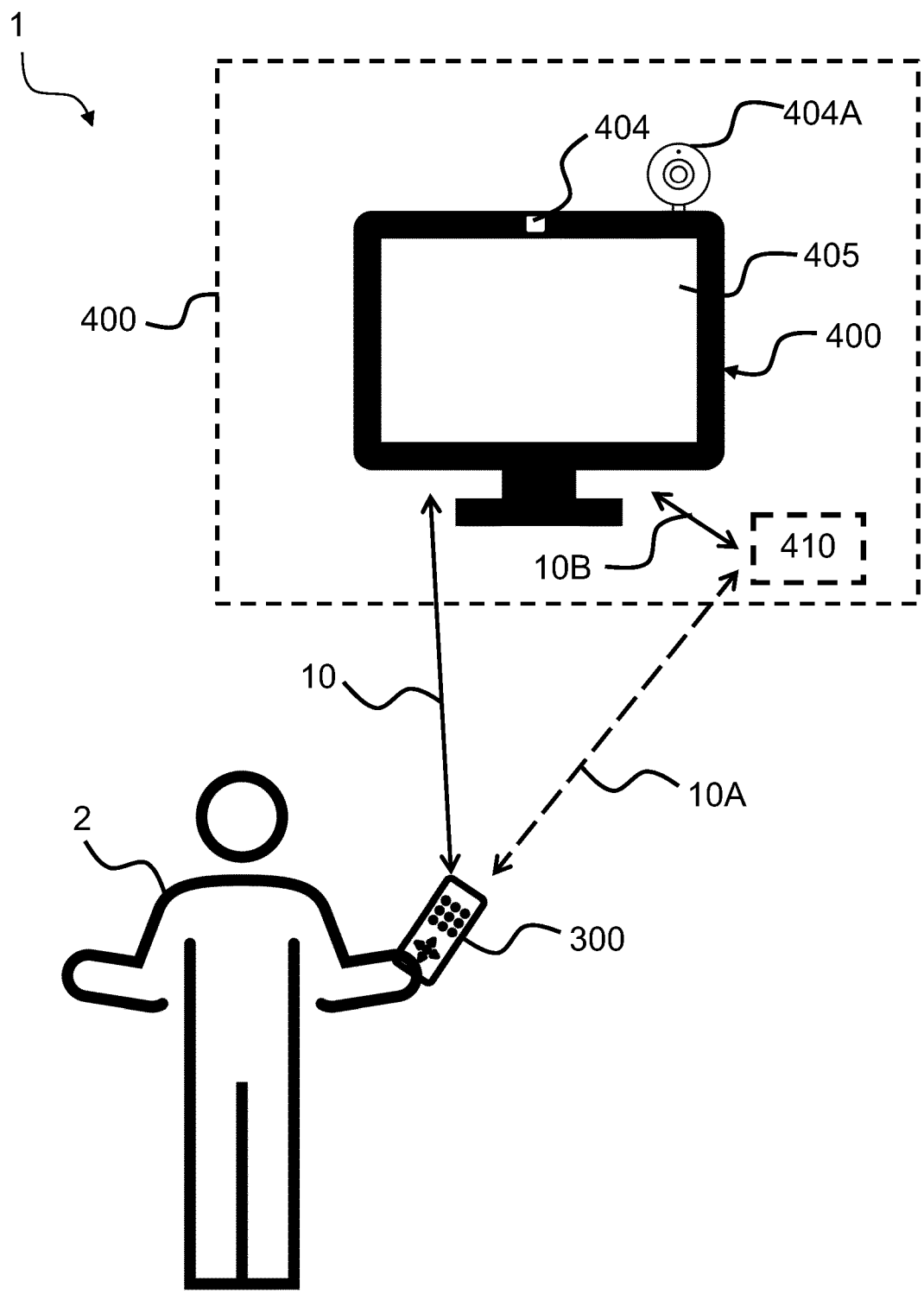
FIG. 1 is a diagram illustrating an example system comprising an example remote control device according to this disclosure and an example display device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

One approach is to have a camera of the display device turned on continuously and to identify the users in front of the display device. However, this could be perceived as privacy intruding by many users. The present disclosure does not violate privacy of users.

Another approach is to use a remote control device (such as a television remote, a smartphone, a wearable device, etc.) to capture motion data (such as a gait detection) of the remote control device while a user is operating the remote control device, then send the motion data to the display device for distinguishing between users. This leads to a large amount of data being sent by the remote control device via a wireless connection, resulting in a draining of the battery on the remote control device. The present disclosure remedies to this shortcoming.

FIG. 1 is an example system 1 comprising an example remote control device 300, an example display device 400 according to this disclosure.

The system 1 described herein may comprise one or more remote control devices 300, one or more display devices 400, and one or more users 2. The system 1 optionally comprises one or more electronic devices 410. For example, the system 1 may be seen as a display system, such as comprising one or more remote control devices according to this disclosure and one or more display devices according to this disclosure.

A remote control device may be seen as a device configured to send control signals to a display device, such as a TV. Examples of a remote control device comprise a television remote control and/or a portable electronic device, (such as a mobile phone, a tablet, a portable computer, a smartphone, a wearable device, a game controller, such as a smart watch, and/or a head-set).

A display device may refer to a television (such as a smart television), a monitor, a projector, and/or a hologram generator. The display device 400 may comprise a camera 404. The system 1 may comprise an external camera unit 404A, such as a web cam, and/or a portable camera. The display device 400 may be configured to communicate with an electronic device 410 via a link 10B, such as a wired and/or wireless link. For example, the display device 400 may be configured to communicate with an electronic device 410, such as a plug-and-play device, via a USB connection. An electronic device, such as electronic device 410, may be seen as a device configured to be operatively coupled with a display device. Examples of electronic devices include a set top box, a gaming console (such as a compact gaming console), and/or an external processing unit (such as a tablet, such as a dongle for playing media). For example, the electronic device 410 may be coupled to the display device 400, via link 10B.

The remote control device 300 may be configured to communicate with the display device 400 via a link 10, such as wired and/or wireless link.

The remote control device 300 may be configured to communicate with the electronic device 410 via a link 10A, such as wired and/or wireless link.

The remote control device may comprise a movement sensor, memory circuitry, processor circuitry and a wireless interface. The remote control device is configured to operate according to a movement model for identifying (and/or detecting) movement of the remote control device. For example, identifying a movement may comprise detecting a movement (such as, obtaining movement data), and determining, based on the detected movement, a user identifier. The remote control device 300 may be configured to obtain, from the movement sensor, movement data indicative of movement of the remote control device 300. The remote control device 300 may be configured to determine, based on the movement data and by using the movement model, a user parameter indicative of a user of the remote control device. The remote control device 300 may be configured to determine whether the user parameter satisfies a first criterion. The remote control device 300 may be configured to output (such as via link 10), when the user parameter satisfies the first criterion, the user parameter to the display device 400. A user parameter may be seen as a parameter associated with a user, such as a parameter linked to a user.

A movement model may be seen as a model and/or scheme configured to provide, based on the movement data, the user parameter. In one or more example remote control devices, the movement model may be stored on a non-transitory storage medium (for example, memory circuitry 301). The movement model may be stored on a non-transitory storage medium of the remote control device 300 being configured to execute the movement model. In one or more example remote control devices, the movement model may comprise model data based on the movement data, such as historical movement data. In other words, the movement model may comprise pre-stored model data indicative of one or more movement patterns, such as indicative of one or more categories of movements (such as categories of gestures). In one or more example remote control devices, the model data may comprise one or more ranges indicative of one or more movement patterns, such as indicative of one or more categories of movements (such as categories of gestures). In one or more example remote control devices, the remote control device 300 may be configured to determine, based the movement model (which comprises the model data), a user parameter indicative of a user of the remote control device 300. In other words, the remote control device may be configured to classify and/or categorize movement data obtained from the movement sensor by using the movement model. For example, the movement model may be configured to correlate (such as compare) the movement data obtained from the movement sensor with model data to detect and/or recognize movement (such as one or more specific gestures). For example, the correlation (such as comparison) may be based on the first criterion disclosed herein, for example based on how a confidence score of the user parameter satisfies the first criterion. For example, the model data may be indicative of the correlation, and may be stored in a lookup table and/or a database. In one or more example remote control devices, the remote control device may comprise correlation circuitry configured to execute the movement model and/or to retrieve the model data. The remote control device 300 may be configured to output (such as via link 10A, for example a wireless communication link and/or a wired link), when the user parameter satisfies the first criterion, the user parameter to the electronic device 410.

The remote control device 300 may be configured to output (such as via link 10A, for example a wireless communication link and/or a wired link), when the user parameter does not satisfy the first criterion, the movement data to the electronic device 410.

The display device 400 may comprise a camera, memory circuitry, a wireless interface, and processor circuitry. The display device 400 may be configured to obtain (such as via link 10, for example a wireless communication link and/or a wired link), from the remote control device 300, movement data indicative of movement of the remote control device 300. The display device 400 may be configured to obtain, from the camera (such as camera 404, for example in the frame of the display device 400, and/or an external camera unit 404A, for example above the frame of the display device 400), image data. The display device 400 may be configured to determine, based on the image data, identification data indicative of a user operating the remote control device 300. The display device 400 may be configured to determine based on the movement data and the identification data, a user parameter indicative of the user. The display device 400 may be configured to update a movement model based on the user parameter. The display device 400 may be configured to output (such as via link 10) the updated movement model to the remote control device.

The electronic device 410 may comprise memory circuitry, a wireless interface, and processor circuitry. The electronic device 410 may be configured to obtain from the remote control device 300, movement data indicative of movement of the remote control device 300. The electronic device 410 may be configured to obtain, from the external camera unit 404A, image data. The electronic device 410 may be configured to determine, based on the image data, identification data indicative of a user operating the remote control device 300. The electronic device 410 may be configured to determine based on the movement data and the identification data, a user parameter indicative of a user. The electronic device 410 may be configured to update a movement model based on the user parameter. The electronic device 410 may be configured to output (such as via link 10A) the updated movement model to the remote control device.

In one or more example systems, the display device 400 may include the electronic device 410 and/or the external camera 404A.

Figure 2:
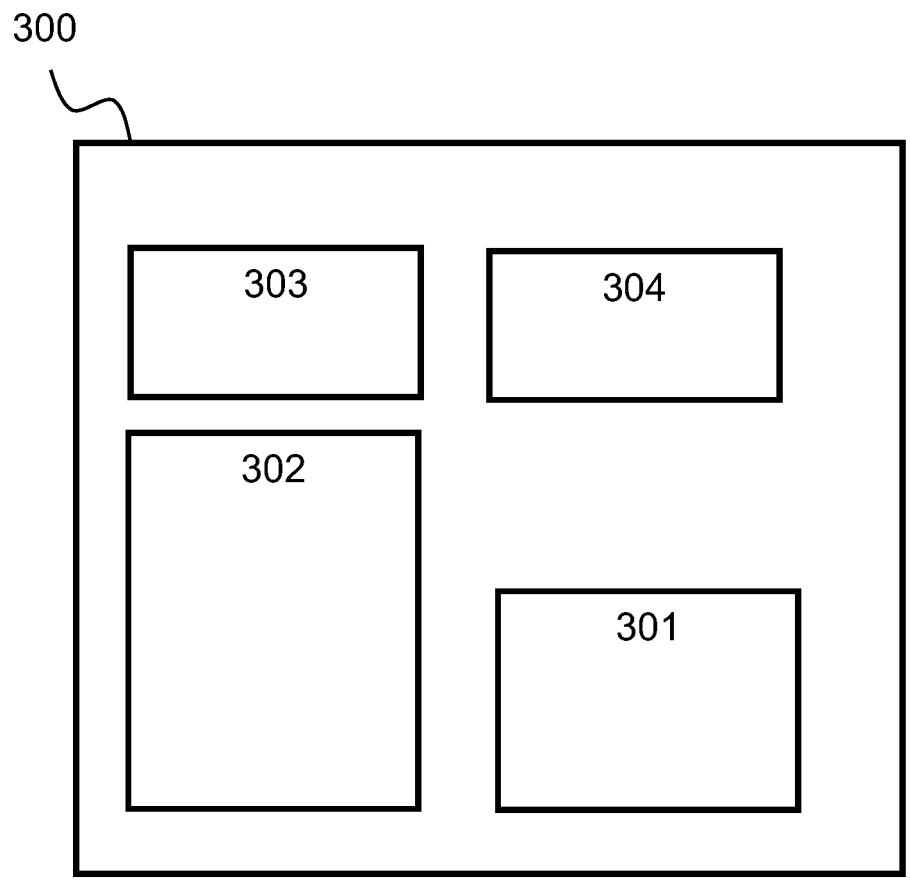
FIG. 2 is a block diagram illustrating an example remote control device according to this disclosure.

FIG. 2 shows a block diagram of an example remote control device 300 according to the disclosure. The remote control device 300 comprises memory circuitry 301, processor circuitry 302, a wireless interface 303 and a movement sensor 304. The remote control device 300 may be configured to perform any of the methods disclosed in FIG. 4A-4B. In other words, the remote control device 300 may be configured to operate according to a movement model for identifying movement of the remote control device 300. For example, the remote control device 300 may detect movement when a user operates the remote control device 300. It may be noted that the remote control device 300 may detect micro movements caused by the user operating the remote control device 300. The micro movements may comprise pressure applied, by a user, on an area of the remote control device 300. The micro movements may comprise the rate at which the actions are performed using the remote control device 300. The micro movements may comprise trembling and/or shaking movements of a user operating and/or holding the remote control device 300. For example, micro movements such as trembling and/or shaking movements of a user operating and/or holding the remote control device 300 may be used by a model for associating movements to a user. For example, micro movements may comprise trembling and/or shaking movements when a particular button and/or key is being pressed. A movement of the remote control device 300 may comprise any combinations of the above micro movements.

The remote control device 300 may optionally comprise a microphone, such as for a user to provide an audio user input. The remote control device 300 may optionally comprise a biometric sensor (such as a fingerprint sensor), such as for a user to provide a biometric user input.

The remote control device 300 may be configured to communicate, such as via the wireless interface 303, with one or more electronic devices such as a display device, such as display device 400 of FIGS. 1 and 2, and/or an electronic device 410 of FIG. 1.

The remote control device 300 may be configured to communicate with one or more electronic devices such as a display device, such as display device 400, and/or an electronic device 410 disclosed herein by using a wired communication, such as using cables.

In one or more example remote control devices, the remote control device 300 may be a television remote control device, such as a remote control device associated with a television (such as a remote control device paired with a television).

In one or more example remote control devices, the remote control device 300 may comprise a mobile electronic device, such as a smart phone, a tablet, and/or a wearable electronic device.

The remote control device 300 is configured to obtain (such as receive, generate and/or retrieve), such as using the processor circuitry 302, from the movement sensor 304, movement data indicative of movement of the remote control device.

In one or more example remote control devices, the movement sensor may include an inertial measurement unit, IMU. The IMU can comprise one or more of: a position sensor (such as a GPS sensor), an accelerometer sensor, and a gyroscope sensor.

In one or more example remote control devices, the movement data comprises one or more of: inertial measurement data, accelerometer data, gyroscope data, and position data.

The remote control device 300 may be configured to obtain the movement data indicative of movement of the remote control device when the movement sensor 304 detects movement of the remote control device. The movement sensor 304 may be configured to send and/or transmit the movement data to the processor circuitry 302, which may execute the movement model (such as a machine learning model) to identify one or more movement patterns in the movement data (such as to determine a user parameter indicative of a user of the remote control device). For example, the remote control device may be configured to obtain movement data indicative of movement of the remote control device when the movement sensor 304 detects movement of the remote control device being above a threshold (such as the detected movement being above a movement threshold). The movement data may be continuously streamed and/or obtained when the movement sensor 304 detects movement of the remote control device being above a threshold.

In one or more examples, when a user tries to operate the remote control device (such as a user holding the remote control device), the movement sensor present in the remote control device dynamically records the movements that a user performs with the remote control device (such as movements that a user performs when holding the remote control device in his/her hand, for example movements that a user exerts on the remote control device, such as on the movement sensor). The movements are represented by movement data. The movement data may comprise movements of the remote control device moving in any direction (such as a lateral direction, and/or a transverse direction). The movement data may comprise a rotational movement of the remote control device. For example, the movement sensor (such as an accelerometer sensor) may return movement data, for example in form of measurement tuple, such as (acc_x, acc_y, acc_z, timestamp).

In one or more example remote control devices, the remote control device may be configured to perform, such as using the processor circuitry 302, inference based on the movement model, such as power-efficient inference based on machine learning, ML, models.

The remote control device 300 is configured to determine, such as using the processor circuitry 302, based on the movement data and by using the movement model, a user parameter indicative of a user (such as one or more users) of the remote control device.

In one or more examples, the user may be an individual user. In one or more examples, the remote control device can determine, such as using the processor circuitry 302, based on the movement data and by using the movement model, user parameters for each user of a plurality of users of the remote control device.

In one or more example remote control devices, the user parameter comprises a user identifier. A user identifier may be an identifier uniquely identifying a user. The user identifier may be a string that is uniquely associated with the user.

In one or more example remote control devices, the user parameter comprises a confidence score associated with the user identifier. A confidence score may be seen as an indicator of the confidence of the association of the user identifier with the user. The remote control device 300 is configured to determine, such as using the processor circuitry 302, whether the user parameter satisfies a first criterion. In one or more example remote control devices, the first criterion comprises a threshold. In one or more example remote control devices, the determination of whether the user parameter satisfies the first criterion is based on determining whether the user parameter is above the threshold, such as determining whether the confidence score is above the threshold.

For example, the remote control device 300 may be configured to determine whether the user parameter (such as the confidence score associated with the user identifier) satisfies a first criterion. For example, the remote control device 300 may be configured to determine whether the user parameter (such as the confidence score associated with the user identifier) is above a threshold, such as a confidence threshold, such 70%, 80% or 90%. For example, when the user parameter (such as the confidence score associated with the user identifier) satisfies the first criterion, the remote control device is configured to output the user parameter to the display device. In other words, the remote control device 300, using the movement model, may provide the user parameter which identifies the user with a certainty represented by the confidence score, and when the confidence score is sufficiently high (based on the threshold comparison), the remote control device 300 sends the user parameter comprising the user identifier to the display device, such as TV.

In one or more example remote control devices, the user parameter does not satisfy the first criterion when the user parameter is equal to or below the threshold, such as when the confidence score is equal to or below the threshold. For example, if a pet accidentally steps on the remote control device, the remote control device may determine a user parameter comprising a user identifier with a confidence score where the confidence score is below the threshold. For example, when the confidence score is below the threshold, the user parameter does not satisfy the first criterion and the remote control device can send the movement data to the display device. For example, the display may determine that the movement data is not indicative or related to a user, for example based on image data. The remote control device 300 is configured to output, such as via the wireless interface 303 and/or using the processor circuitry 302, when the user parameter satisfies the first criterion, the user parameter to a display device, such as the display device 400. In other words, when the confidence score associated with the user identifier is above the threshold then it is considered as the user parameter satisfies the first criterion.

In one or more example remote control devices, the remote control device 300 is configured to output the user parameter to the electronic device, such as electronic device 410, such as a set top box, STB, and/or a console.

In one or more example remote control devices, when the user parameter does not satisfy the first criterion, the remote control device 300 is configured to output (such as transmit), such as via the wireless interface 303 and/or using the processor circuitry 302, the movement data to the display device. In other words, when the confidence score associated with the user identifier is below and/or equal to the threshold, the user parameter does not satisfy the first criterion. In one or more examples, when the user parameter does not satisfy the first criterion, the remote control device may transmit the movement data to the display device. For example, in other words, the movement model may provide the user parameter which identifies the user with a certainty represented by the confidence score, which may show uncertainty about the user identifier. For example, when the confidence score is not sufficiently high (based on the threshold comparison, for example the confidence score shows uncertainty about the user identifier comprised in the user parameter), the remote control sends the movement data to the display device, such as TV.

In one or more example remote control devices, when the user parameter does not satisfy the first criterion, the remote control device 300 is configured to obtain (such as receive and/or retrieve), such as via the wireless interface 303 and/or using the processor circuitry 302, from the display device, an updated movement model.

In one or more example remote control devices, the updated movement model may be based on labelled movement data. For example, when the updated model is received from the display device, the updated movement model may be based on movement data that comprises one or more movement patterns associated with one or more users. The one or more movement patterns may be the movement patterns where the remote control had difficulty identifying an appropriate user.

In one or more example remote control devices, the updated movement model may comprise unlabelled movement data.

In one or more example remote control devices, the determination of the user parameter comprises a detection of a movement pattern based on the movement data.

In one or more example remote control devices, the movement pattern may comprise one or more movement patterns associated with a user of the remote control device.

In one or more example remote control devices, the movement pattern may comprise one or more movement patterns associated with multiple users, such as a group of users.

In one or more example remote control devices, the movement pattern may comprise a pattern indicative of micro movements associated with a user. The micro movements may comprise pressure applied, by a user, on an area of the remote control device 300. The micro movements may comprise the rate at which the actions are performed using the remote control device 300. The micro movements may comprise trembling and/or shaking movements of a user operating and/or holding the remote control device 300.

It is an advantage of the present disclosure that it improves the accuracy in predicting a user operating a remote control device based on the micro movements associated with the user. The micro movements may act as a unique signature identity for each user.

In one or more example remote control devices, the movement pattern may comprise a movement pattern indicative of a gesture, such as a specific gesture. For example, moving the remote control device in the shape of an infinity symbol to access a feature and/or a mode of the display device.

In one or more example remote control devices, the detection of the movement pattern comprises a detection of a gesture corresponding to a mode for controlling the display device.

In one or more example remote control devices, a specific gesture may comprise moving the remote control device in a specific pattern indicative of a switch of a user. For example a specific gesture may be indicative of a specific sequence of movements, such as indicative of a specific characteristic of the movements, such a periodicity of the pattern.

In one or more examples, the specific gesture may comprise moving the remote control device in a periodic pattern indicative of a change in an electronic device's parameters, such as an increase in volume and/or decrease in volume.

In one or more example remote control devices, the remote control device 300 is configured to output, such as via the wireless interface 303 and/or using the processor circuitry 302, one or more instructions to the display device.

In one or more example remote control devices, the one or more instructions may correspond to a mode, such as a group mode, and/or a family mode.

In one or more example remote control devices, the remote control device 300 is configured to determine, such as using the processor circuitry 302, whether the movement data satisfies a second criterion.

In one or more example remote control devices, the second criterion may comprise identifying a user switch within a time window, such as a time period. In one or more examples, the time window may be less than one minute. In one or more examples, the time window may be less than 5 seconds.

In one or more example remote control devices, when the movement data satisfies the second criterion, the remote control device 300 is configured to output, such as via the wireless interface 303 and/or using the processor circuitry 302, to the display device, one or more instructions indicative of a group mode.

In one or more example remote control devices, the determination of whether the movement data satisfies the second criterion is based on determining whether a user switch (such as a change of the user operating the remote control device, for example a change of user holding the remote control device) happens within the time widow. For example, the movement data may satisfy the second criterion when the remote control device identifies a user switch within a one minute time window. When the movement data satisfies the second criterion, the remote control device may be configured to output the one or more instructions indicative of a group mode. For example, the remote control device may be configured to output (such as generate) one or more instructions to the display device, such as instructing the display device (such as a content aggregator application on the display device), to recommend content that fits the group of users (such as multiple users) based on their viewing habits.

In one or more example remote control devices, when the movement data does not satisfy the second criterion, the remote control device 300 is configured to refrain from outputting the one or more instructions indicative of the group mode. For example, when the user switch does not happen within a time window (such as a time window of less than one minute), the remote control device is configured to refrain from outputting instructions indicative of a group mode (such as staying in a current mode).

In one or more example remote control devices, the remote control device 300 is configured to obtain, such as via the wireless interface 303 and/or using the processor circuitry 302, via a user interface of the remote control device (such as a button of the remote control device 300 and/or a movement of the remote control device 300 indicative of a selection), a user input indicative of a selection of a user interface object representative of a user corresponding to the user identifier or a selection of a user interface object representative of a user not corresponding to the user identifier.

In one or more example remote control devices, the user interface object is displayed by the display device. In other words, a user may perform a selection of a user interface object on the display device (such as on the display 405) by using the remote control device, such as by pressing one or more buttons of the remote control device.

In one or more example remote control devices, the remote control device 300 is configured to transmit, such as via the wireless interface 303 and/or using the processor circuitry 302, to the display device, an instruction indicative of a validation parameter. In other words, the instruction indicative of the validation parameter may be based on the user input, such as based on the user selecting a user interface object representative of a user corresponding to the user identifier or a selection of a user interface object representative of a user not corresponding to the user identifier.

In one or more example remote control devices, the validation parameter indicates, based on the user input, a validation of the user. By having a validation of the user, it is an advantage of the present disclosure to improve user identification by using a camera and movement data collaboratively.

In one or more example remote control devices, the remote control device 300 is configured to obtain, via a user interface of the remote control device 300, a user input indicative of a selection of a user interface object representative of a user not corresponding to the user identifier, wherein the user interface object is displayed by the display device; and wherein the processor circuitry is configured to transmit to the display device, an instruction indicative of a validation parameter, wherein the validation parameter indicates, based on the user input, a rejection of the user.

The wireless interface 303 is configured for wireless communications via a wireless communication system, such as short-range wireless communications systems, such as Wi-Fi, Bluetooth, Zigbee, IEEE 802.11, IEEE 802.15, infrared and/or the like.

The wireless interface 303 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands and/or the like.

Figure 4A:
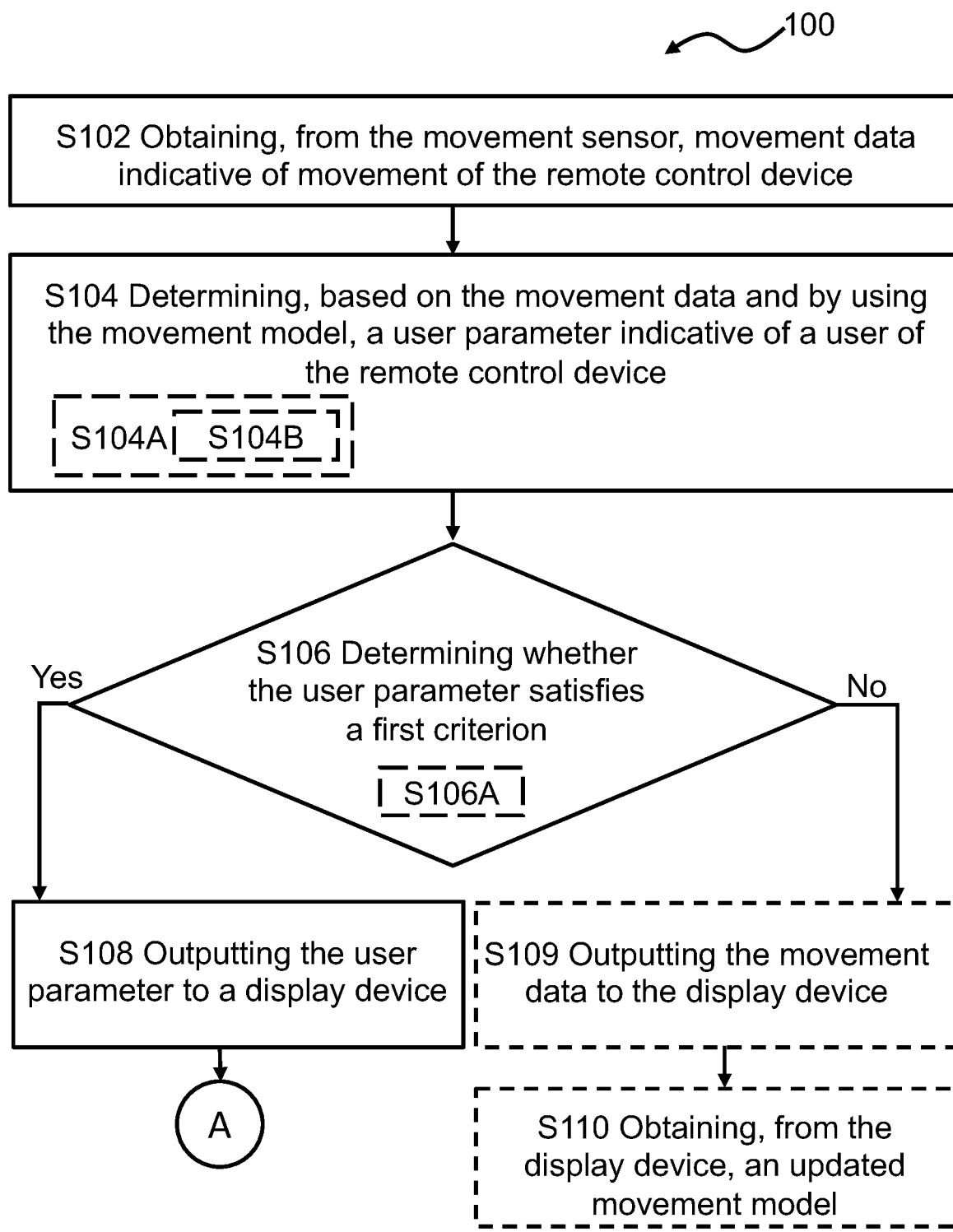
FIG. 4 is a flow-chart illustrating an example method, performed in a remote control device, for identifying movement of the remote control device according to this disclosure.
Figure 4B:
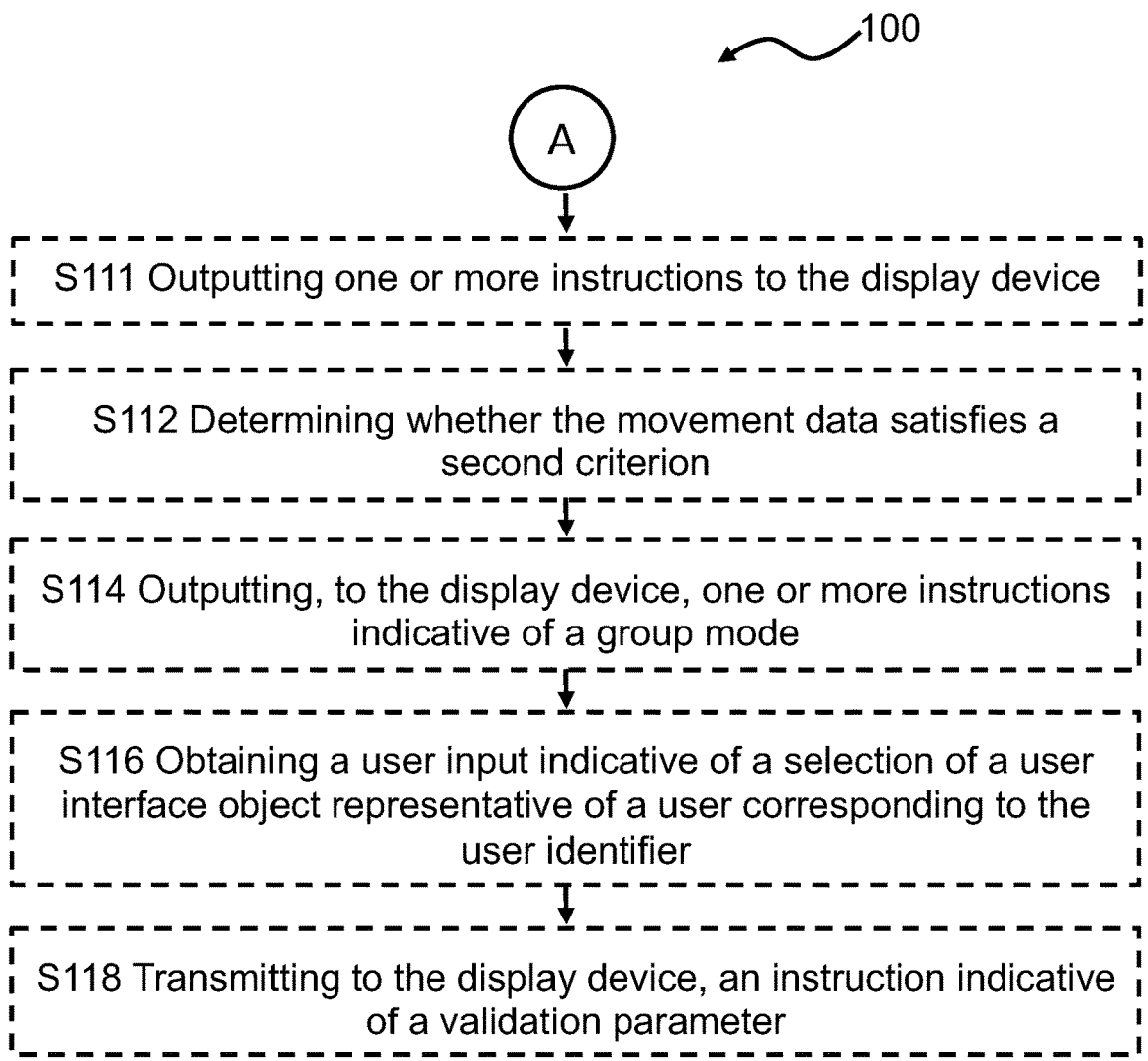

The remote control device 300 is optionally configured to perform any of the operations disclosed in FIG. 4A-4B (such as any one or more of S104A, S104B, S106A, S109, S110, S111, S112, S114, S116, S118). The operations of the remote control device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the remote control device 300 may be considered a method that the remote control device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 2). Memory circuitry 301 is considered a non-transitory computer readable medium.

Memory circuitry 301 may be configured to store information such as a movement model, movement data, a user parameter, a user identifier, and/or a validation parameter in a part of the memory.

Figure 3:
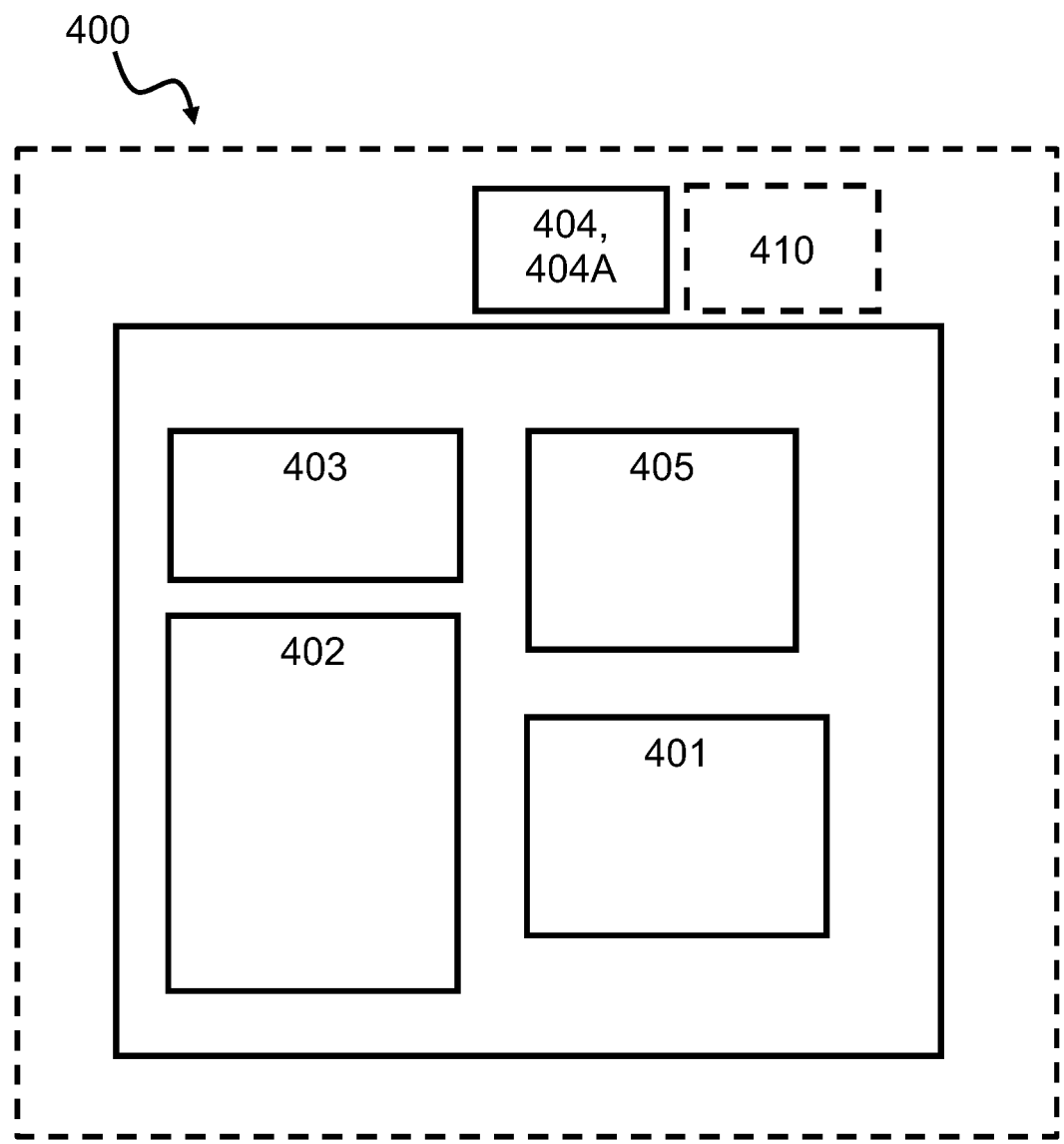
FIG. 3 is a block diagram illustrating an example display device according to this disclosure.

FIG. 3 shows a block diagram of an example display device 400 according to the disclosure. The display device 400 comprises a display 405, memory circuitry 401, processor circuitry 402, a wireless interface 403, and a camera 404. The display device 400 may be configured to perform any of the methods disclosed in FIG. 5A-5B.

The display device 400 may optionally comprise a microphone. The display device 400 may optionally comprise a speaker.

The display device 400 may be configured to communicate with a remote control device, such as the remote control device 300 of FIGS. 1 and 2.

The display device 400 may be configured to communicate with an electronic device, such as the electronic device 410 of FIG. 1.

In one or more example display devices, the display device 400 may be a television (such as smart television). In one or more example display devices, the display device 400 may be a projector. In one or more example display devices, the display device 400 may be a monitor. In one or more example display devices, the display device 400 may be a hologram projector.

The display device 400 is configured to obtain (such as via the wireless interface 403 and/or using the processor circuitry 402) from a remote control device (such as remote control device 300 of FIG. 1 and/or FIG. 2), movement data indicative of movement of the remote control device.

In one or more example display devices, the movement data comprises one or more of: inertial measurement data, accelerometer data, gyroscope data, and a position data.

In one or more example display devices, the display device 400 (such as a smart television) may be configured to receive (such as via the wireless interface 403 and/or using the processor circuitry 402) the movement data indicative of movement of the remote control device 300 (such as a remote control device to operate a TV). The movement data may comprise the inertial measurement data (such as accelerometer data, gyroscope data, and/or position data) related to the remote control device. The movement data may comprise lateral, transverse, and/or rotational movements of the remote control device. The one or more of lateral, transverse, and rotational movements of the remote control device may be performed by a user while operating the remote control device.

In one or more examples, the display device 400 may be configured to obtain (such as receive and/or retrieve) the movement data when the remote control device finds uncertainty in identifying a user of the remote control device.

The display device 400 is configured to obtain (such as via the wireless interface 403 and/or using the processor circuitry 402), from the camera (such as the camera 404 and/or the external camera 404A), image data.

In one or more examples, the display device 400 may be configured to obtain image data from the camera 404, 404A. The camera may be configured to record one or more frames (such as turn on the camera briefly). The camera may be an infrared camera. The camera may be a thermal imaging camera. The image data may comprise one or more of: a 2 dimensional image, a 3 dimensional image, an infrared image, and/or thermal image.

In one or more examples, the display device 400 may be configured to obtain image data from an external camera (such as external camera 404A of FIG. 1). The external camera may be configured to record one or more frames. The external camera may be an infrared camera. The external camera may be a thermal imaging camera. The image data may comprise one or more of: a 2-dimensional image, a 3-dimensional image, an infrared image, and/or a thermal image.

In one or more examples, the display device 400 may be configured to obtain image data from the remote control, which may optionally comprise a camera unit.

In one or more example display devices, the display device 400 is configured to obtain (such as via the wireless interface 403 and/or using the processor circuitry 402) an audio parameter indicative of a voice of the user.

In one or more examples, the display device 400 may be configured to obtain the biometric data from the remote control device.

In one or more examples, the display device 400 may be configured to obtain an audio parameter indicative of a voice of the user. The audio parameter may be based on an audio input of a user. The display device may be configured to obtain the audio parameter via the microphone. The display device may be configured to obtain the audio parameter from the remote control device (such as via a microphone of the remote control device). The display device may be configured to obtain the audio parameter from an electronic device (such as electronic device 410).

In one or more examples, the display device 400 may be configured to identify the user based on the audio parameter.

In one or more example display devices, the display device 400 is configured to obtain (such as via the wireless interface 403 and/or using the processor circuitry 402) biometric data of the user. For example, the biometric data may comprise fingerprint data, eyeprint data (such as iris identification).

In one or more example display devices, the biometric data may comprise one or more facial features associated with a user of the remote control device. In one or more example display devices, the biometric data may comprise one or more fingerprint features associated with a user of the remote control device. In one or more example display devices, the biometric data may comprise one or more facial features obtained from an image.

The display device 400 is configured to determine (such as via using the processor circuitry 402), based on the image data, identification data indicative of a user operating the remote control device. For example, identification of a user may be determined through facial recognition. In one or more examples, identification of the user may be determined through an object detection (such as wearable objects associated with the user of the remote control device). For example, the identification of the user may be determined based on a detection of a user holding a remote control device (such as a holder).

In one or more example display devices, the display device 400 is configured to, when no user using the remote control device is identified, forgo determining the user parameter.

In one or more example display devices, determining identification data may comprise detecting one or more facial features being indicative of a face. In one or more example display devices, determining identification data may comprise detecting a pose of a user (such as a user operating and/or holding a remote control device). In one or more example display devices, determining identification data may comprise detecting an object (such as detecting a remote control device).

In one or more examples, the display device 400 may be configured to identify, based on the identification data, a user, a user holding the remote control device, and/or an object.

In one or more example display devices, determining the identification data comprises identifying, by using a detection model (such as a classification model, for example a face recognition model), the user operating the remote control device. For example, identifying a user operating the remote control device from a group of users identified earlier.

When the display device receives movement data, the display device may activate the camera for a time period. The time period may be in the range of 1 second to 60 seconds, such as less than 10 seconds. The display device may be configured to obtain image data, via the camera (such as camera 404 and/or external camera 404A), during the time period.

In one or more examples, the display device 400 may be configured to dynamically determine, based on the movement data and/or image data, a user parameter being indicative of a user operating the remote control device.

In one or more example display devices, the display device 400 is configured to select (such as using the processor circuitry 402), based on the identified user operating the remote control device, a mode of the display device (such as a group mode, a parental control mode and/or a child mode). For example, the display device 400 is configured to select (such as using the processor circuitry 402), based on the identified user operating the remote control device, a mode of an application running on the display device.

In one or more examples, the display device 400 may be configured to select, when the display device identifies a child operating the remote control device, a child mode of the display device (such as a child mode of an active content application of the display device).

In one or more examples, the display device 400 may be configured to select, when the display device identifies a child accessing a content application of the display device with the remote control device, a child mode present in the content application.

The display device 400 is configured to determine (such as via using the processor circuitry 402), based on the movement data and the identification data, a user parameter indicative of the user (such as one or more users). In other words, the display device may be configured to determine a user parameter based an association of movement data with identification data, such as an association of movement data with one or more identified users.

In one or more example display devices, the user parameter comprises a user identifier.

A user identifier may be an identifier uniquely identifying a user. The user identifier may be a string that is uniquely associated with the user.

In one or more example display devices, the user parameter comprises a confidence score associated with the user identifier.

A confidence score may be seen as an indicator of the confidence of the association of the user identifier with the user.

In one or more example display devices, the display device 400 is configured to determine (such as using the processor circuitry 402) whether the user parameter satisfies a first criterion.

In one or more example display devices, the first criterion comprises a threshold.

For example, the display device may be configured to determine whether the user parameter (such as a confidence score associated with the user identifier) satisfies a first criterion. For example, the display device may be configured to determine whether the user parameter (such as the confidence score associated with the user identifier) is above a threshold, such as a confidence threshold, such as at least 70%, at least 80%, or at least 90%.

In one or more example display devices, the display device 400 is configured to output (such as via the wireless interface 403 and/or using the processor circuitry 402), when the user parameter satisfies the first criterion, the user parameter.

In one or more example display devices, the determination of whether the user parameter satisfies the first criterion is based on determining whether the user parameter is above the threshold.

For example, when the user parameter (such as confidence score associated with the user identifier) satisfies the first criterion, the remote control device may be configured to output the user parameter. In one or more examples, the display device 400 may output the user parameter to the remote control device.

In other words, the display device, such as using the movement model, may provide the user parameter which identifies a user with a certainty represented by the confidence score. When the confidence score is sufficiently high (based on the threshold comparison), the display device 400 may be configured to transmit the user parameter comprising the user identifier to the remote control device and/or store the user parameter on the memory circuitry.

In one or more example display devices, when the user parameter satisfies the first criterion, the display device 400 may be configured to update the movement model based on the user parameter satisfying the first criterion.

In one or more example display devices, the display device 400 is configured to output (such as via the wireless interface 403 and/or using the processor circuitry 402), when the user parameter does not satisfy the first criterion, the movement data.

When the confidence score associated with the user identifier is below and/or equal to the threshold (based on the threshold comparison), the display device may be configured to transmit the movement data to the remote control device and/or store the movement data on the memory circuitry.

In one or more example display devices, when the user parameter does not satisfy the first criterion, the display device may be configured to update the movement model based on the movement data (such as the user parameter not satisfying the first criterion).

In other words, when the confidence score associated with the user identifier is below and/or equal to the threshold, the user parameter does not satisfy the first criterion.

For example, in other words, the movement model may provide the user parameter which identifies the user with a certainty represented by the confidence score, which may show uncertainty about the user identifier. For example, when the confidence score is not sufficiently high (based on the threshold comparison, for example the confidence score shows uncertainty about the user identifier comprised in the user parameter), the display device 400 outputs the movement data.

In one or more example display devices, the display device 400 may be configured to execute one or more movement models corresponding to a movement model executed by the remote control device.

In one or more example display devices, the determination of the user parameter comprises a detection of a movement pattern based on the movement data.

In one or more examples, the display device 400 may be configured to detect, using machine learning models, a movement pattern based on the movement data received from the remote control device. The machine learning model may be a supervised learning model. The machine learning model may be a decision tree based model. The machine learning model may an unsupervised model.

In one or more example display devices, the detection of the movement pattern comprises a detection of a gesture corresponding to a mode for controlling the display device.

In one or more example display devices, the movement pattern may comprise a movement pattern indicative of a gesture, such as a specific gesture. For example, the movement data is indicative of a shape of an infinity symbol to access a feature and/or a mode of the display device 400.

In one or more example display devices, the detection of the movement pattern comprises a detection of a gesture corresponding to a mode for controlling the display device 400.

In one or more example display devices, the movement data may comprise a specific gesture indicative of a movement of a remote control device in a specific pattern indicative of a switch of a user, such as indicative of a specific sequence of movements, such as indicative of a specific characteristic of the movements, such a periodicity of the pattern.

In one or more examples, the movement data may comprise a specific gesture indicative of a movement of the remote control device in a periodic pattern indicative of a change in an electronic device's parameters, such as an increase in volume and/or decrease in volume.

In one or more example display devices, the display device 400 is configured to determine (such as using the processor circuitry 402) whether the movement data satisfies a second criterion.

In one or more example display devices, the second criterion may comprise identifying a user switch within a time window, such as a time period. In one or more examples, the time window may be less than one minute. In one or more examples, the time window may be less than 5 seconds.

In one or more example display devices, the determination of whether the movement data satisfies the second criterion is based on determining whether the user switch happens with in the time widow. For example, the display device may be configured to determine the user switch within a one minute time window, when the movement data satisfies the second criterion, the display device 400 is configured to output the one or more instructions indicative of a group mode.

In one or more example remote control devices, when the movement data does not satisfy the second criterion, the remote control device is configured to refrain from outputting the one or more instructions indicative of the group mode. For example, when the user switch does not happen within a time window (such as a time window less than one minute), the remote control device is configured to refrain from outputting instructions indicative of a group mode.

In one or more example display devices, when the movement data satisfies the second criterion, the display device 400 is configured to output (such as via the wireless interface 403 and/or using the processor circuitry 402) one or more instructions indicative of a group mode (such as switching to family mode).

In one or more example display devices, when the movement data does not satisfy the second criterion, the display device may be configured to output (such as via the wireless interface 403 and/or using the processor circuitry 402) one or more instructions indicative of a default mode (such as a child mode).

In one or more examples, the second criterion may be satisfied, when the identified user is switched within one minute to another user. When a change of user occurs within one minute of time, an instruction may be outputted by the processor circuitry 402, to change the display device mode to a group mode of the display device 400. In an example scenario, when the display device mode is switched to a group mode, recommendations for all the identified users within a time period are grouped together. In an example scenario, when the display device mode is switched to a group mode, group recommendations may be displayed on the display device 400 (such as on the display 405). This may be advantageous where multiple users are viewing the television.

The display device 400 is configured to update (such as using the processor circuitry 402) a movement model based on the user parameter. In other words, the display device 400 may be configured to train and/or re-train the movement model based on the user parameter.

The display device 400 may be configured to execute a movement model, such as machine learning models, supervised learning and/or decision trees to determine identification data, such as to identify a user operating the remote control device. The display device may be configured to execute power efficient machine learning models.

In one or more example display devices, the movement model may be stored in the memory circuitry 401 of the display device 400.

The display device 400 is configured to output (such as via the wireless interface 403 and using the processor circuitry 402, for example transmit to the remote control device) the updated movement model to the remote control device.

In one or more examples, the display device 400 may be configured to obtain the movement data from the remote control device. The movement data may comprise movement patterns associated with the movements performed by a user using the remote control device. The display device 400 may be configured to obtain image data from the camera. The display device 400 may obtain image data from the external camera unit. Based on the image data, the display device 400 may determine identification data indicative of the user operating the remote control device. Based on the movement data and identification data, the display device 400 may determine a user parameter indicative of a user. The display device 400 may be configured to use a movement model (such as a machine learning model, such as a supervised learning model, a decision tree model) to determine the user parameter. The movement model may use the movement data and/or identification data as input. The display device may be configured to use a movement model present in the remote control device to determine the user parameter. When the user is identified, the display device 400 may be configured to update the movement model based on the user parameter. The display device 400 may be configured to output the movement model to the remote control device.

In one or more example display devices, the display device 400 is configured to display (such as using the processor circuitry 402), on the display 405, for validation, a user interface object representative of the user identified.

In one or more example display devices, the display device 400 is configured to configured to receive, via the wireless interface 403, from the remote control device, an instruction (such as a signal) indicative of a validation parameter.

In one or more example display devices, the validation parameter indicates a validation or rejection of the user identified.

In other words, the display device may be configured to perform 2-factor authentication to identify the user of the remote control device.

The wireless interface 403 is configured for wireless communications via a wireless communication system, such as short-range wireless communications systems, such as Wi-Fi, Bluetooth, Zigbee, IEEE 802.11, IEEE 802.15, infrared.

The wireless interface 403 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands.

Figure 5A:
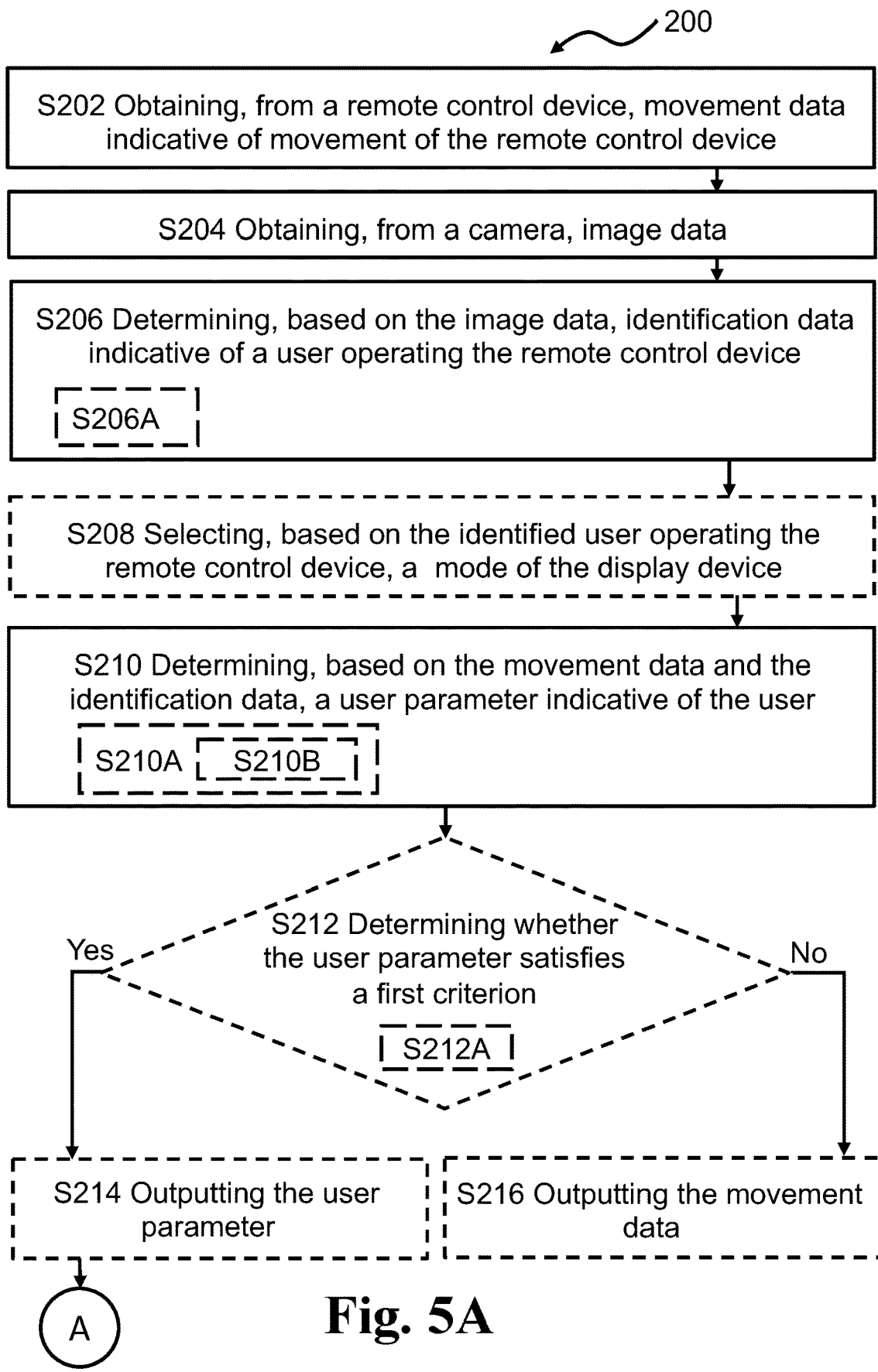
FIG. 5 is a flow-chart illustrating an example method performed in a display for identifying a user operating a remote control device according to this disclosure.
Figure 5B:
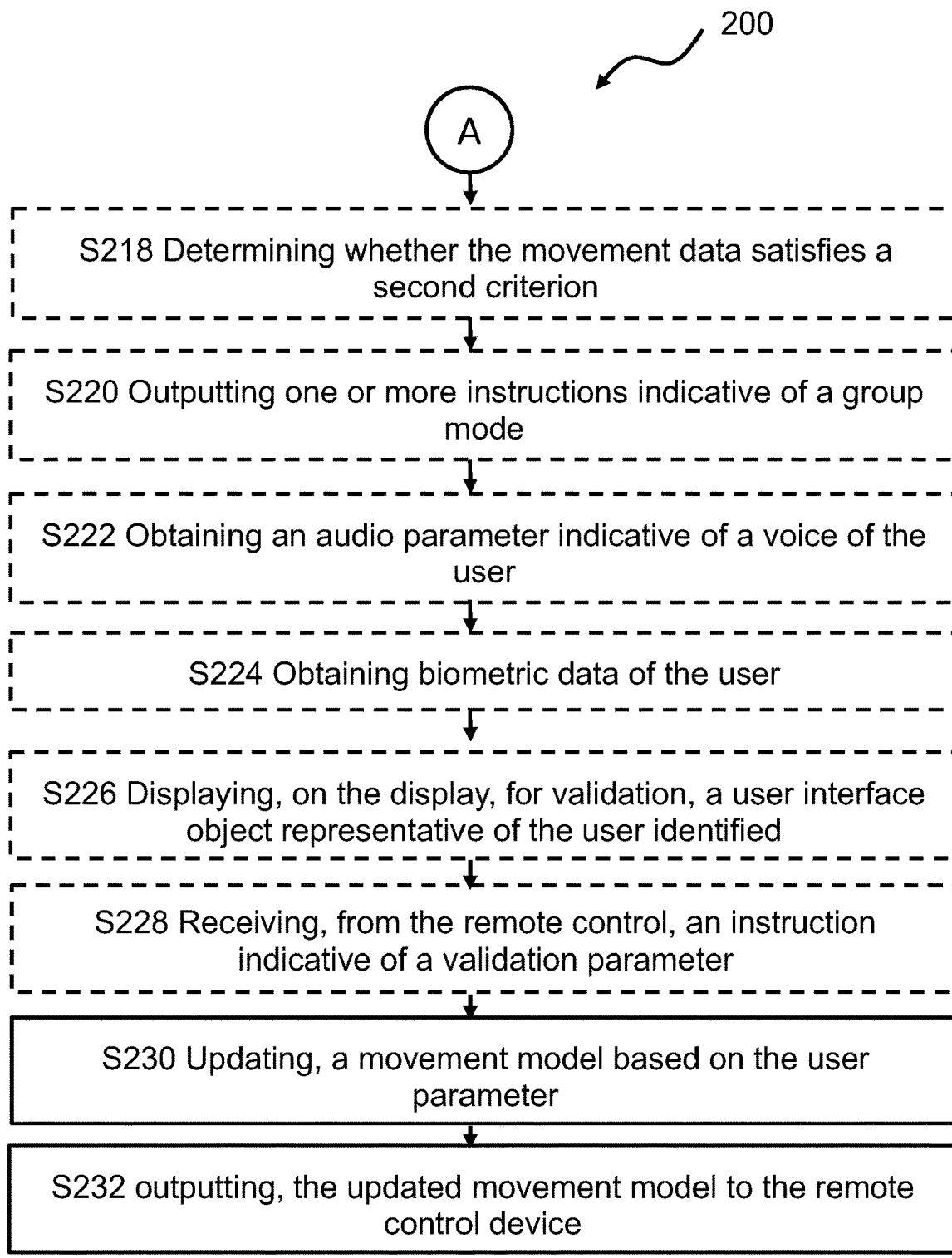

Processor circuitry 402 is optionally configured to perform any of the operations disclosed in FIG. 5A-5B (such as any one or more of S206A, S208, S210A, S210B, S212A, S214, S216, S218, S220, S222, S224, S226, S228). The operations of the display device 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the display device 400 may be considered a method that the display device 400 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 3). Memory circuitry 401 is considered a non-transitory computer readable medium.

Memory circuitry 401 may be configured to store a movement model, image data, movement data, a user parameter, a user identifier, identification data, and updated movement model in a part of the memory.

FIG. 4A-4B shows a flow diagram of an example method 100, performed by a remote control device according to the disclosure. The method 100 may be performed for example, for detecting and/or identifying movement of the remote control device, for example, for determining and/or outputting a user parameter, for example indicative of a user. The method 100 may be performed for example, for identifying a user via a user parameter and/or via movement data. The method 100 may be performed by a remote control device disclosed herein, such as remote control device 300 of FIG. 1, and FIG. 2.

The method 100 comprises obtaining S102, from the movement sensor, movement data indicative of movement of the remote control device.

The method 100 comprises determining S104, based on the movement data and by using the movement model, a user parameter indicative of a user of the remote control device.

The method 100 comprises determining S106 whether the user parameter satisfies a first criterion.

The method 100 comprises outputting S108, when the user parameter satisfies the first criterion, the user parameter to a display device.

In one or more example methods, the movement data comprises one or more of: inertial measurement data, accelerometer data, gyroscope data, and position data.

In one or more example methods, the user parameter comprises a user identifier.

In one or more example methods, the user parameter comprises a confidence score associated with the user identifier.

In one or more example methods, the first criterion comprises a threshold.

In one or more example methods, the determining S106 of whether the user parameter satisfies the first criterion is based on determining S106A whether the user parameter is above the threshold.

In one or more example methods, the determining S104 of the user parameter comprises detecting S104A a movement pattern based on the movement data.

In one or more example methods, the detecting S104A of the movement pattern comprises detecting S104B a gesture corresponding to a mode for controlling the display device.

In one or more example methods, when the user parameter does not satisfy the first criterion, the method 100 comprises outputting S109 the movement data to the display device.

In one or more example methods, when the user parameter does not satisfy the first criterion, the method 100 comprises obtaining S110, from the display device, an updated movement model.

In one or more example methods, the method 100 comprises outputting S111 one or more instructions to the display device.

In one or more example methods, the method 100 comprises determining S112 whether the movement data satisfies a second criterion.

In one or more example methods, when the movement data satisfies the second criterion, the method 100 comprises outputting S114, to the display device, one or more instructions indicative of a group mode.

In one or more example methods, the method 100 comprises obtaining S116 a user input indicative of a selection of a user interface object representative of a user corresponding to the user identifier.

In one or more example methods, the user interface object is displayed by the display device.

In one or more example methods, the method 100 comprises transmitting S118 to the display device, an instruction indicative of a validation parameter.

In one or more example methods, the validation parameter indicates, based on the user input, a validation or rejection of the user.

FIG. 5A-5B shows a flow diagram of an example method 200, performed by a display device according to the disclosure, for identifying a user operating a remote control device. The method 200 may be performed by a display device disclosed herein, such as display device 400 of FIG. 1, and FIG. 3.

The method 200 comprises obtaining S202, from a remote control device, movement data indicative of movement of the remote control device.

The method 200 comprises obtaining S204, from a camera, image data.

The method 200 comprises determining S206, based on the image data, identification data indicative of the user operating the remote control device.

The method 200 comprises determining S210, based on the movement data and the identification data, a user parameter indicative of the user.

The method 200 comprises updating S230, a movement model based on the user parameter.

The method 200 comprises outputting S232, the updated movement model to the remote control device.

In one or more example methods, the movement data comprises one or more of: inertial measurement data, accelerometer data, gyroscope data, and position data.

In one or more example methods, the determining S206 of the identification data comprises identifying S206A, by using a detection model, the user operating the remote control device.

In one or more example methods, the method 200 comprises selecting S208, based on the identified user operating the remote control device, a mode of the display device.

In one or more example methods, the user parameter comprises a user identifier.

In one or more example methods, the user parameter comprises a confidence score associated with the user identifier.

In one or more example methods, the method 200 comprises determining S212 whether the user parameter satisfies a first criterion.

In one or more example methods, when the user parameter satisfies the first criterion, the method 200 comprises outputting S214 the user parameter.

In one or more example methods, when the user parameter does not satisfy the first criterion, the method 200 comprises outputting S216 the movement data.

In one or more example methods, the first criterion comprises a threshold.

In one or more example methods, the determining S212 of whether the user parameter satisfies the first criterion is based on determining S212A whether the user parameter is above the threshold.

In one or more example methods, the determining S210 of the user parameter comprises detecting S210A a movement pattern based on the movement data.

In one or more example methods, the detecting S210A of the movement pattern comprises detecting S210B a gesture corresponding to a mode for controlling the display device.

In one or more example methods, the method 200 comprises determining S218 whether the movement data satisfies a second criterion.

In one or more example methods, when the movement data satisfies the second criterion, the method 200 comprising outputting S220 one or more instructions indicative of a group mode.

In one or more example methods, the method 200 comprises obtaining S222 an audio parameter indicative of a voice of the user.

In one or more example methods, the method 200 comprises obtaining S224 biometric data of the user.

In one or more example methods, the method 200 comprises displaying S226, on the display, for validation, a user interface object representative of the user identified.

In one or more example methods, the method 200 comprises receiving S228, from the remote control, an instruction indicative of a validation parameter.

In one or more example methods, the validation parameter indicates a validation or rejection of the user identified.

Examples of methods, remote control devices, and display devices according to the disclosure are set out in the following items:

Item 1. A remote control device comprising:
 a movement sensor,
 memory circuitry,
 a wireless interface, and
 processor circuitry configured to operate according to a movement model for identifying movement of the remote control device,
 wherein the processor circuitry is configured to:
 obtain, from the movement sensor, movement data indicative of movement of the remote control device;
 determine, based on the movement data and by using the movement model, a user parameter indicative of a user of the remote control device;
 determine whether the user parameter satisfies a first criterion; and
 wherein the processor circuitry is configured to, when the user parameter satisfies the first criterion:
 output the user parameter to a display device.

Item 2. The remote control device according to item 1, wherein the movement data comprises one or more of: inertial measurement data, accelerometer data, gyroscope data, and position data.

Item 3. The remote control device according to any of items 1-2, wherein the user parameter comprises a user identifier.

Item 4. The remote control device according to item 3, wherein the user parameter comprises a confidence score associated with the user identifier.

Item 5. The remote control device according to any of items 1-4, wherein the first criterion comprises a threshold.

Item 6. The remote control device according to item 5, wherein the determination of whether the user parameter satisfies the first criterion is based on determining whether the user parameter is above the threshold.

Item 7. The remote control device according to any of items 1-6, wherein the determination of the user parameter comprises a detection of a movement pattern based on the movement data.

Item 8. The remote control device according to item 7, wherein the detection of the movement pattern comprises a detection of a gesture corresponding to a mode for controlling the display device.

Item 9. The remote control device according to any of items 1-8, wherein, when the user parameter does not satisfy the first criterion, the processor circuitry is configured to output the movement data to the display device.

Item 10. The remote control device according to any of items 1-9, wherein, when the user parameter does not satisfy the first criterion, the processor circuitry is configured to obtain, from the display device, an updated movement model.

Item 11. The remote control device according to any of items 1-10, wherein the remote control device is configured to output one or more instructions to the display device.

Item 12. The remote control device according to any of items 1-11, wherein the processor circuitry is configured to determine whether the movement data satisfies a second criterion; and when the movement data satisfies the second criterion, the processor circuitry is configured to output, to the display device, one or more instructions indicative of a group mode.

Item 13. The remote control device according to any of items 1-12, wherein the processor circuitry is configured to obtain, via a user interface of the remote control device, a user input indicative of a selection of a user interface object representative of a user corresponding to the user identifier, wherein the user interface object is displayed by the display device; and wherein the processor circuitry is configured to transmit to the display device, an instruction indicative of a validation parameter, wherein the validation parameter indicates, based on the user input, a validation of the user.

Item 14. A display device comprising:
 a display,
 a camera,
 memory circuitry,
 a wireless interface, and
 processor circuitry,
 wherein the processor circuitry is configured to:
 obtain, from a remote control device, movement data indicative of movement of the remote control device;
 obtain, from the camera, image data;
 determine, based on the image data, identification data indicative of a user operating the remote control device;
 determine, based on the movement data and the identification data, a user parameter indicative of the user;
 update a movement model based on the user parameter; and
 output the updated movement model to the remote control device.

Item 15. The display device according to item 14, wherein the movement data comprises one or more of: inertial measurement data, accelerometer data, gyroscope data, and a position data.

Item 16. The display device according to any of items 14-15, wherein determining the identification data comprises identifying, by using a detection model, the user operating the remote control device.

Item 17. The display device according to item 16, wherein the processor circuitry is configured, based on the identified user operating the remote control device, to select a mode of the display device.

Item 18. The display device according to any of items 14-17, wherein the user parameter comprises a user identifier.

Item 19. The display device according to item 18, wherein the user parameter comprises a confidence score associated with the user identifier.

Item 20. The display device according to any of items 14-19, wherein the processor circuitry is configured to determine whether the user parameter satisfies a first criterion.

Item 21. The display device according to item 20, wherein the processor circuitry is configured to, when the user parameter satisfies the first criterion, output the user parameter.

Item 22. The display device according to item 20, wherein the processor circuitry is configured to, when the user parameter does not satisfy the first criterion, output the movement data.

Item 23. The display device according to any of items 20-22, wherein the first criterion comprises a threshold.

Item 24. The display device according to item 23, wherein the determination of whether the user parameter satisfies the first criterion is based on determining whether the user parameter is above the threshold.

Item 25. The display device according to any of items 14-24, wherein the determination of the user parameter comprises a detection of a movement pattern based on the movement data.

Item 26. The display device according to item 25, wherein the detection of the movement pattern comprises a detection of a gesture corresponding to a mode for controlling the display device.

Item 27. The display device according to any of items 14-26, wherein the processor circuitry is configured to determine whether the movement data satisfies a second criterion; and when the movement data satisfies the second criterion, the processor circuitry is configured to output one or more instructions indicative of a group mode.

Item 28. The display device according to any of items 14-27, wherein the processor circuitry is configured to obtain an audio parameter indicative of a voice of the user.

Item 29. The display device according to any of items 14-28, wherein the processor circuitry is configured to obtain biometric data of the user.

Item 30. The display device according to any of items 16-29, wherein the processor circuitry is configured to display, on the display, for validation, a user interface object representative of a user corresponding to the user identified; and wherein the processor circuitry is configured to receive, via the wireless interface, from the remote control device, an instruction indicative of a validation parameter, wherein the validation parameter indicates a validation or rejection of the user identified.

Item 31. A method (100), performed by a remote control device, the method comprising:
obtaining (S102), from the movement sensor, movement data indicative of movement of the remote control device;
determining (S104), based on the movement data and by using the movement model, a user parameter indicative of a user of the remote control device;
determining (S106) whether the user parameter satisfies a first criterion; and
when the user parameter satisfies the first criterion:
outputting (S108) the user parameter to a display device.

Item 32. The method according to item 31, wherein the movement data comprises one or more of: inertial measurement data, accelerometer data, gyroscope data, and position data.

Item 33. The method according to any of items 31-32, wherein the user parameter comprises a user identifier.

Item 34. The method according to item 33, wherein the user parameter comprises a confidence score associated with the user identifier.

Item 35. The method according to any of items 31-34, wherein the first criterion comprises a threshold.

Item 36. The method according to item 35, wherein the determining (S106) of whether the user parameter satisfies the first criterion is based on determining (S106A) whether the user parameter is above the threshold.

Item 37. The method according to any of items 31-36, wherein the determining (S104) of the user parameter comprises detecting (S104A) a movement pattern based on the movement data.

Item 38. The method according to item 37, wherein the detecting (S104A) of the movement pattern comprises detecting (S104B) a gesture corresponding to a mode for controlling the display device.

Item 39. The method according to any of items 31-38, wherein, when the user parameter does not satisfy the first criterion, the method comprises outputting (S109) the movement data to the display device.

Item 40. The method according to any of items 31-39, wherein, when the user parameter does not satisfy the first criterion, the method comprises obtaining (S110), from the display device, an updated movement model.

Item 41. The method according to any of items 31-40, wherein the method comprises outputting (S111) one or more instructions to the display device.

Item 42. The method according to any of items 31-41, wherein the method comprises determining (S112) whether the movement data satisfies a second criterion; and when the movement data satisfies the second criterion, the method comprising outputting (S114), to the display device, one or more instructions indicative of a group mode.

Item 43. The method according to any of items 31-42, wherein the method comprises obtaining (S116) a user input indicative of a selection of a user interface object representative of a user corresponding to the user identifier, wherein the user interface object is displayed by the display device; and wherein the method comprises transmitting (S118) to the display device, an instruction indicative of a validation parameter, wherein the validation parameter indicates, based on the user input, a validation or rejection of the user.

Item 44. A method (200), performed by a display device, for identifying a user operating a remote control device, the method comprising:
  obtaining (S202), from the remote control device, movement data indicative of movement of the remote control device;
  obtaining (S204), from a camera, image data;
  determining (S206), based on the image data, identification data indicative of the user operating the remote control device;
  determining (S210), based on the movement data and the identification data, a user parameter indicative of the user;
  updating (S230), a movement model based on the user parameter; and
  outputting (S232), the updated movement model to the remote control device.
Item 45. The method according to item 44, wherein the movement data comprises one or more of: inertial measurement data, accelerometer data, gyroscope data, and position data.
Item 46. The method according to any of items 44-45, wherein the determining (S206) of the identification data comprises identifying (S206A), by using a detection model, the user operating the remote control device.
Item 47. The method according to item 46, wherein the method comprises selecting (S208), based on the identified user operating the remote control device, a mode of the display device.
Item 48. The method according to any of items 44-47, wherein the user parameter comprises a user identifier.
Item 49. The method according to item 48, wherein the user parameter comprises a confidence score associated with the user identifier.
Item 50. The method according to any of items 44-49, wherein the method comprises determining (S212) whether the user parameter satisfies a first criterion.
Item 51. The method according to item 50, wherein when the user parameter satisfies the first criterion, the method comprises outputting (S214) the user parameter.
Item 52. The method according to item 50, wherein when the user parameter does not satisfy the first criterion, the method comprises outputting (S216) the movement data.
Item 53. The method according to any of items 50-52, wherein the first criterion comprises a threshold.
Item 54. The method according to item 53, wherein the determining (S212) of whether the user parameter satisfies the first criterion is based on determining (S212A) whether the user parameter is above the threshold.
Item 55. The method according to any of items 44-54, wherein the determining (S210) of the user parameter comprises detecting (S210A) a movement pattern based on the movement data.
Item 56. The method according to item 55, wherein the detecting (S210A) of the movement pattern comprises detecting (S210B) a gesture corresponding to a mode for controlling the display device.
Item 57. The method according to any of items 44-56, the method comprising determining (S218) whether the movement data satisfies a second criterion; and when the movement data satisfies the second criterion, the method comprising outputting (S220) one or more instructions indicative of a group mode.
Item 58. The method according to any of items 44-57, the method comprising obtaining (S222) an audio parameter indicative of a voice of the user.
Item 59. The method according to any of items 44-58, the method comprising obtaining (S224) biometric data of the user.
Item 60. The method according to any of items 44-59, the method comprising displaying (S226), on the display, for validation, a user interface object representative of the user identified; and the method comprising receiving (S228), from the remote control, an instruction indicative of a validation parameter, wherein the validation parameter indicates a validation or rejection of the user identified.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5B comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A remote control device comprising:
a movement sensor,
memory circuitry,
a wireless interface, and
processor circuitry configured to operate according to a movement model for identifying movement of the remote control device, wherein the processor circuitry is configured to:
obtain, from the movement sensor, movement data indicative of movement of the remote control device;
determine, based on the movement data and by using the movement model, a user parameter indicative of a user of the remote control device, wherein the user parameter comprises a user identifier corresponding to the user of the remote control device and a confidence score associated with the user identifier;
determine whether the user parameter satisfies a first criterion; and
wherein the processor circuitry is configured to, when the user parameter satisfies the first criterion:
output the user parameter to a display device.

2. The remote control device according to claim 1, wherein the movement data comprises one or more of: inertial measurement data, accelerometer data, gyroscope data, and position data.

3. The remote control device according to claim 1, wherein the first criterion comprises a threshold.

4. The remote control device according to claim 3, wherein the determination of whether the user parameter satisfies the first criterion is based on determining whether the user parameter is above the threshold.

5. The remote control device according to claim 1, wherein the determination of the user parameter comprises a detection of a movement pattern based on the movement data.

6. The remote control device according to claim 5, wherein the detection of the movement pattern comprises a detection of a gesture corresponding to a mode for controlling the display device.

7. The remote control device according to claim 1, when the user parameter does not satisfy the first criterion, the processor circuitry is configured to output the movement data to the display device.

8. The remote control device according to claim 1, wherein, when the user parameter does not satisfy the first criterion, the processor circuitry is configured to obtain, from the display device, an updated movement model.

9. The remote control device according to claim 1, wherein the remote control device is configured to output one or more instructions to the display device.

10. A remote control device comprising:
a movement sensor,
memory circuitry,
a wireless interface, and
processor circuitry configured to operate according to a movement model for identifying movement of the remote control device, wherein the processor circuitry is configured to:
obtain, from the movement sensor, movement data indicative of movement of the remote control device;
determine, based on the movement data and by using the movement model, a user parameter indicative of a user of the remote control device;
determine whether the user parameter satisfies a first criterion;
wherein the processor circuitry is configured to, when the user parameter satisfies the first criterion:
output the user parameter to a display device;
determine whether the movement data satisfies a second criterion; and
wherein the processor circuitry is configured to, when the movement data satisfies the second criterion:
output, to the display device, one or more instructions indicative of a group mode.

11. The remote control device according to claim 1, wherein the processor circuitry is configured to obtain, via a user interface of the remote control device, a user input indicative of a selection of a user interface object representative of a user corresponding to the user identifier, wherein the user interface object is displayed by the display device; and wherein the processor circuitry is configured to transmit to the display device, an instruction indicative of a validation parameter, wherein the validation parameter indicates, based on the user input, a validation of the user.

12. A display device comprising:
a display,
a camera,
memory circuitry,
a wireless interface, and
processor circuitry,
wherein the processor circuitry is configured to:
obtain, from a remote control device, movement data indicative of movement of the remote control device;
obtain, from the camera, image data;
determine, based on the image data, identification data indicative of a user operating the remote control device;
determine, based on the movement data and the identification data, a user parameter indicative of the user, wherein the user parameter comprises a user identifier corresponding to the user and a confidence score associated with the user identifier;
update a movement model based on the user parameter; and
output the updated movement model to the remote control device.

13. The display device according to claim 12, wherein the movement data comprises one or more of: inertial measurement data, accelerometer data, gyroscope data, and a position data.

14. The display device according to claim 12, wherein determining the identification data comprises identifying, by using a detection model, the user operating the remote control device.

15. The display device according to claim 14, wherein the processor circuitry is configured, based on the identified user operating the remote control device, to select a mode of the display device.

16. The display device according to claim 12, wherein the user parameter comprises a user identifier.

17. The display device according to claim 16, wherein the user parameter comprises a confidence score associated with the user identifier.

18. The display device according to claim 12, wherein the processor circuitry is configured to determine whether the user parameter satisfies a first criterion.

* * * * *